Patented Mar. 27, 1934

1,952,408

UNITED STATES PATENT OFFICE 1,952,408

WATER SOFTENING COMPOUND

Obie L. Bell, Belmont, Ohio

No Drawing. Application May 12, 1932, Serial No. 610,993

3 Claims. (Cl. 210—23)

This invention relates to a water softening compound and more particularly to such a compound in cake form, and to the method of producing the same.

One object of the invention is to provide a water softening compound for domestic use which will be of such a character that it may be conveniently used for quickly softening the water in household containers.

A further object of the invention is to provide a water softening compound in the form of a cake which may be grasped in the hand and immersed and moved about in the water and thus caused to give up enough of its substance to soften the water.

A further object of the invention is to provide a cake of water softening compound which will remain in a hard compact form indefinitely but which will disintegrate slowly when immersed in water.

Other objects of the invention will appear and the compound and method for producing the same are described.

The method of producing the cake of water softening compound comprises briefly the mixing of the water softening elements with a suitable binding material and with water or other liquid in sufficient quantity to form a thick paste or plastic mass which is then formed into cakes under pressure.

The water softening elements preferably comprise relatively large quantities of sodium carbonate ($Na_2CO_3$), commonly called soda ash, and tri sodium phosphate, ($Na_3PO_4$). With the water softening elements are mixed relatively small quantities of calcium chloride ($CACL_2$), and sodium chloride, ($NACL$), which have the property of retaining moisture in sufficient quantity to bind the several elements together in a solid mass which will not disintegrate readily but will remain hard and compact indefinitely. The several ingredients may be used in varying proportions but I have secured the best results by using them in the following proportions:

| | Percent |
|---|---|
| Sodium carbonate | 62.5 |
| Tri sodium phosphate | 30 |
| Calcium chloride | 5 |
| Sodium chloride | 2.5 |

The several ingredients are used in a pulverized form and are mixed with water into a thick paste or plastic mass and this mass is divided into cakes and subjected to pressure, preferably by forming the cakes in dies. As the formed cakes set or dry they become very hard and will remain in solid compact form indefinitely. When such a cake is immersed in water the surface portions thereof will disintegrate and the cake will give up sufficient of its substance to soften the water, the amount required depending, of course, upon the quantity of water to be softened. The cake is preferably moved about in the water to thoroughly distribute the softening substance and, if desired, the water may be tested, by touch or otherwise, to determine when it has been properly softened but the user of the compound will quickly acquire the ability to determine without test the length of time it is necessary to submerge the compound in order to properly soften the water. Inasmuch as the compound contains no caustic material or other materials which are injurious to the skin or to fabrics no harm will result from the use of an excess quantity of the compound.

While I have described in detail the ingredients entering into the water softening compound and the method of producing the same I do not desire to be limited to the details thereof as various modifications thereof may occur to a person skilled in the art.

Having now fully described my invention, what I claim as new and desire to secure by Letters Patent, is:

1. A water softening compound comprising the following ingredients in substantially the proportions named, sodium carbonate—62.5%, tri sodium phosphate—30%, calcium chloride—5% and sodium chloride 2.5%.

2. A water softening compound in cake form comprising sodium carbonate and tri-sodium phosphate bound together in a solid mass by calcium chloride and sodium chloride.

3. A water softening compound in cake form comprising relatively large quantities of sodium carbonate and tri-sodium phosphate, and a binder comprising relatively small quantities of calcium chloride and sodium chloride.

OBIE L. BELL.